May 2, 1950     J. SWEENEY     2,506,247

EASILY DETACHABLE NONSKID CHAIN

Filed May 23, 1946

Inventor
JAMES SWEENEY
By Lester L. Sargent
Attorney

Patented May 2, 1950

2,506,247

UNITED STATES PATENT OFFICE 2,506,247

EASILY DETACHABLE NONSKID CHAIN

James Sweeney, Detroit, Mich.

Application May 23, 1946, Serial No. 671,794

3 Claims. (Cl. 152—233)

The object of my invention is to provide a novel, easily detachable non-skid chain mounted on the tire in such a manner as to allow it to give to a certain extent, under tension of traction, so that the tire will ride over the tread instead of cutting into it.

It is also an object of my invention to provide means for easily detaching such a chain from the tire and to provide improved means for adjusting the device for use either as an anchored cross-chain element or for the use of a series of cross-chains arranged to creep along the tire.

I attain the objects of my invention by the means illustrated in the accompanying drawings, in which.

Like numerals designate like parts in each of the several views.

Figure 4:
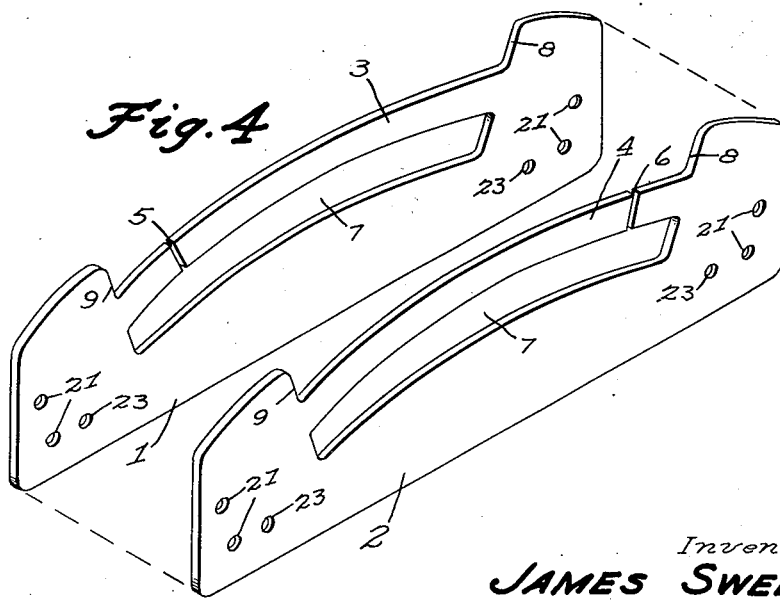
Fig. 4 is a perspective view of a pair of the connector plates showing the difference in location of the slits near opposite ends of said plates.

Referring to the accompanying drawings, I provide a pair of connector plates 1 and 2, as shown in Fig. 4 having integral arcuate spring carriers 3 and 4, the spring carrier 3 having a slit 5 near one end, and the spring carrier 4 having a similar slit 6 positioned near the other end, as shown in Fig. 4.

Interposed between spring carriers 3 and 4 and the main body of the connector plates 1 and 2 are similar curved slots 7. Each of the connector plates 1 and 2 have an outwardly slanting surface 8 at one end and a corresponding reversely slanted surface 9 at the other end, as shown in Fig. 4.

An outer retaining washer 10 is mounted on each of the spring carriers 3 and 4, which are positioned close together. The washer 10 abuts against each of the slanting surfaces 8. A coil spring 12 is mounted on spring carriers 3 and 4 and abuts against washer 10, which in turn abuts against slanting surfaces 8.

A similar spring 13 is mounted on spring carriers 3 and 4 at the other end of said spring carriers and abuts against washer 11. Washer 11 in turn abuts against slanting surfaces 9 of connector plates 1 and 2.

An inner retaining cup washer 14 is engaged by the inner end of spring 12 and a similar inner retaining cup washer 15 is engaged by the inner end of coil spring 13. Washers 14 and 15 in turn abut against the looped portion 17 of the spacer strap 16. Spacer strap 16 has a pair of spaced apertures 18 which apertures are engaged by the hook ends of an end link 19 to which the cross chain 20 is attached. At opposite ends of the connector plates 1 and 2 are apertures 21 to which the hook ends of the connector coils 22 are engaged. An additional aperture 23 is spaced inwardly from the lower aperture 21 at opposite ends of the connector plates 1 and 2 whereby the hook ends of the connector coil 22 may be engaged in the apertures nearest the bottom edge of the connector plates so as to bring the connector coil in the position shown in Fig. 1 for anchoring it to the rim of the wheel and at right angles to the position shown in Fig. 3 in which latter position the cross chains are permitted to creep along the tire. The coils 22 are in turn connected to one or more links 24 which extend approximately parallel with the rim and connect one cross chain holding device with the next similar device but permit the entire series of cross chains to creep on the tire.

Figure 3:
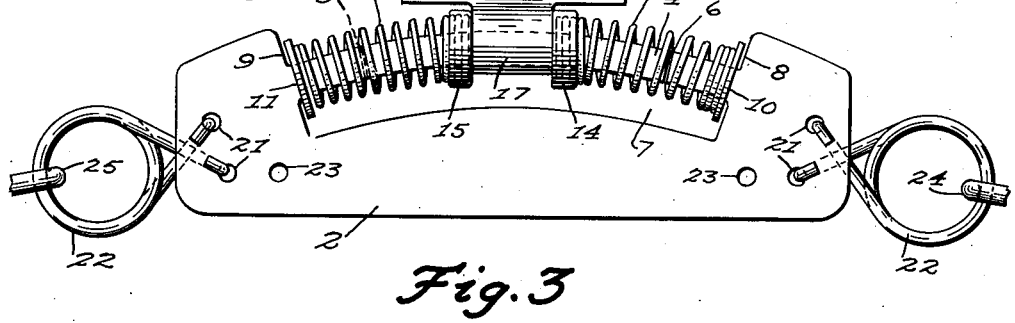
Fig. 3 is a side elevation of my invention with the connector coils shown in position for connecting one anchor plate to the chain connected to the next anchor plate.

As will be noted from Fig. 4 of the drawing the washers 10 and 11, springs 12 and 13 and washers 14 and 15 may be readily inserted through the slits 5 and 6 to connector plates 1 and 2 respectively for resiliently retaining the centrally positioned slidable strap 16 as shown in Fig. 3.

Figure 1:
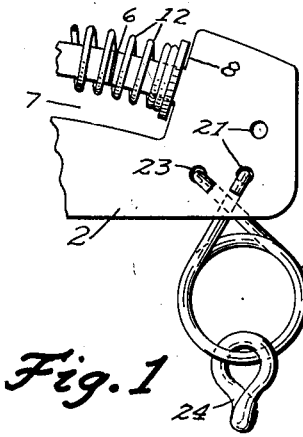
Figure 1 is a detailed side elevation of a portion of the device with the coil spring connector shown in position for anchoring the device in one position on the rim of the wheel.
Figure 2:
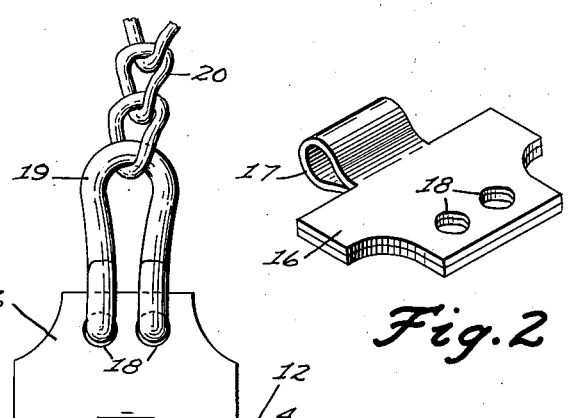
Fig. 2 is a perspective view of the centrally positioned pivot strap.

The connector coils 22 may be engaged in the aperture 23 and one of the apertures 21, as shown in Fig. 1, at each end of the connector plate 1 and the links 24 extended through openings in the wheel with similar connector coils 22 at the opposite ends engaging in the apertures 23 and one of the apertures 21 for securing the cross chain 20 on the wheel singly. Of course any number of these cross chains may be applied but are secured independently of each other with this arrangement.

The connector coils 22 may also be engaged in the apertures 21 in each of the connector plates 1 and 2 and the links 24 extended to another connector coil 22 which is similarly engaged in the apertures 21 of another connector plate to provide a series of cross chains positioned at spaced intervals around the outer periphery of the wheel. With this arrangement all of the cross chains are connected and applied to the wheel at one time in a conventional manner. This permits the chains and connector plates to creep around the tire and rim in the usual way.

What I claim is:

1. In a non-skid chain comprising in combination a transversely disposed chain having straps attached to the end links thereof, connector plates having spring carriers integral therewith and on which said straps are slidably mounted, spring means engaging said straps whereby limited movement thereof on said carriers is permitted, and means for anchoring the connector plates on a wheel, said anchoring means comprising coil springs having hook ends for engaging the connector plates on opposite sides of the wheel and a chain extending from one coil spring connector element to the other.

2. A non-skid chain comprising in combination a transversely disposed chain, straps connected to the end links of said chain, connector plates having spring carriers integral therewith and on which said straps are slidably mounted, spring means mounted on said carriers and engaging said straps whereby limited movement thereof is permitted, said spring carriers on adjacent connector plates having slits near opposite ends thereof whereby said springs may be readily applied thereto but preventing disengagement of said springs therefrom due to the slit on one spring carrier being near one end thereof and the slit on the other spring carrier being near the other end thereof, and means for anchoring the connector plates on a wheel.

3. A non-skid chain for application to a vehicle wheel comprising connector plates for disposition on opposite sides of the wheel rim, a non-skid chain having each of its opposite ends operatively connected to one of said plates adjacent one side thereof, a plurality of apertures disposed in triangular relation adjacent each of the end portions of said plates, one pair of said apertures being located adjacent the side edges and spaced therefrom and another pair of said apertures being located adjacent the end edges and spaced therefrom, and securing means selectively engageable in said one pair of said apertures whereby said chain may be secured in place on said wheel singly or in said other pair of said apertures whereby said chain may be secured in place on said wheel coupled with similar chains and plates positioned at spaced intervals around the outer periphery of said wheel.

JAMES SWEENEY.

REFERENCES CITED

The following references are of record in the file of this patent:

UNITED STATES PATENTS

| Number | Name | Date |
|---|---|---|
| 1,450,981 | McLoughlin | Apr. 10, 1923 |
| 2,403,312 | Sweeney | July 2, 1946 |